United States Patent
Funaki

[11] Patent Number: 5,970,264
[45] Date of Patent: Oct. 19, 1999

[54] PHOTOGRAPHIC CAMERA HAVING A MEMORY FOR STORING FILM CARTRIDGE DATA TOGETHER WITH DATA REPRESENTING THE NUMBER OF UNEXPOSED FRAMES ON THE FILM IN THE CARTRIDGE

[75] Inventor: Akihiko Funaki, Omiya, Japan

[73] Assignees: Fuji Photo Film Co., Ltd., Kanagawa; Fuji Photo Optical Co., Ltd., Saitama, both of Japan

[21] Appl. No.: 08/878,780

[22] Filed: Jun. 19, 1997

[30] Foreign Application Priority Data

Jun. 20, 1996 [JP] Japan ..................................... 8-160189
Jun. 20, 1996 [JP] Japan ..................................... 8-160197

[51] Int. Cl.⁶ ..................................................... G03B 1/60
[52] U.S. Cl. ........................... 396/299; 396/390; 396/284
[58] Field of Search ..................................... 396/281, 284, 396/297, 299, 310, 311, 319, 387, 389, 390, 515

[56] References Cited

U.S. PATENT DOCUMENTS 5,666,186  9/1997  Meyerhoefer et al. .................. 396/281

*Primary Examiner*—Safet Metjahic
*Assistant Examiner*—J. K. Han
*Attorney, Agent, or Firm*—Sughrue, Mion, Zinn, Macpeak & Seas, PLLC

[57] ABSTRACT

A photographic camera having a halfway film rewind mode in which a cartridge having film with part of the frames exposed and part of the frames unexposed is rewound into the film cartridge. The camera also allows the user to set a mode in which data relating to the cartridge can be entered into the memory of the camera. The memory of the camera stores the user input cartridge data together with data representative of the member of unexposed film frames remaining on the film in the cartridge.

9 Claims, 12 Drawing Sheets

PHOTOGRAPHIC CAMERA HAVING A MEMORY FOR STORING FILM CARTRIDGE DATA TOGETHER WITH DATA REPRESENTING THE NUMBER OF UNEXPOSED FRAMES ON THE FILM IN THE CARTRIDGE

BACKGROUND OF THE INVENTION

1. Field of the Invention

This invention relates to a photographic camera for use with a new type of standardized film cassette, which is different from the "DX-code system" film cartridge, that has been recently standardized.

2. Description of Related Art

A new type of film cartridge, which is loaded in a photographic camera of the invention, has been standardized for an advanced photographic system (APS). For the purpose of providing an understanding of the new type of film cartridge, reference is made to FIGS. 12A and 12B. Generally, the film cartridge includes a generally cylindrical light-tight cartridge shell 30 in which a roll of a fresh filmstrip 34 wound on a spool 32 rotatable inside the film cartridge 30 is loaded at the manufacturer. The cartridge shell 30 has a light block door 36 which is rotated closed to prevent ambient light from entering the interior of the cartridge through a film egress/ingress slot as film is taken out of the camera or until it is placed in the camera, and which is then rotated open to allow the filmstrip 34 to move into and out of the cartridge interior through the film egress/ingress slot.

This new type of film cartridge 30 has what is called a visual exposure index (VEI). That is, the film cartridge 30 at one of its ends is provided with a data disk 38 rotating together with the spool 32. The data disk 38 has optically readable bar codes of various information concerning the filmstrip 34, such as the type of film, the speed or sensitivity of film and the number of exposures, printed on its outer surface. The film cartridge 30 at another one of its ends is formed with four cut-outs 40, 42, 44 and 46 differently shaped in the forms of circle, square, cross and semicircle, respectively. A tongue-shaped white indicator (not shown) rotatable together with the spool 32 is located on a side of the cartridge interior and is viewed through one of the respective cut-outs 40, 42, 44 and 46 from the exterior of the film cartridge 30 according to angular positions. Specifically, the white indicator viewed through the circular cut-out 40 provides an indication that the filmstrip 34 is fresh. The white indicator viewed through the square cut-out 42 provides an indication that the filmstrip 34 has been photo-processed. The white indicator viewed through the cross cut-out 44 provides an indication that the filmstrip 34 has been fully exposed but is not photo-processed. The white indicator viewed through the semicircular cut-out 46 provides an indication that the filmstrip 34 is partly exposed and partly unexposed.

The filmstrip 34 has a silver salt photosensitive layer coated on one surface $34_F$ of the film base and a magnetic recording layer on another surface $34_R$ of the film base. The filmstrip 34 also has magnetic tracks 52 and 54 coated along and on opposite sides of each film frame 48 on the one surface $34_F$ of the film base and perforations 50 formed to define opposite ends of each film frame 48. Information on exposure, such as the type of exposure light, the focal length, etc., and the title of a picture are magnetically recordable on and readable from the magnetic tracks 52 and 54 at the photographer's request.

The film cartridge 34 has an optically readable bar code 56 indicating its own identification number (ID number) printed on the outer surface thereof.

When a camera of the APS type is loaded with the film cartridge 34, the camera automatically reads the optically readable data, such as the bar codes, on the data disk 38 by means of an optical reader incorporated therein. While the camera automatically opens the light block door 36, it also automatically detects an angular position of the white indicator to automatically advance the filmstrip 34 out of the film cartridge 34 until a first unexposed film frame is placed in the camera exposure frame if the filmstrip 34 is fresh or partly exposed. On the other hand, if the filmstrip 34 is fully exposed or has been photo-processed, the camera judges from the angular position that the filmstrip 34 is unavailable, and holds the filmstrip 34 in the interior of the film cartridge 30.

When the filmstrip 34 is fully exposed, while the camera rewinds the exposed filmstrip 34 into the interior of the film cartridge 30, it aligns the white indicator with the cross cut-out 44 and locks it, and closes the light lock door 36. When unloading the film cartridge 30 from the camera, the film cartridge 30 shows the white indicator through the cross cut-out 44, indicating to the photographer or persons handling the film cartridge 30 that the filmstrip 34 in the film cartridge 30 is fully exposed. When the filmstrip 34 is intentionally rewound into the interior of the film cartridge 30 after it is partly exposed, the camera aligns the white indicator with the semicircular cut-out 46 and locks it, and closes the light lock door 36. When unloading the film cartridge 30 from the camera, the film cartridge 30 shows the white indicator through the semicircular cut-out 46, indicating to the photographer or persons handling the film cartridge 30 that the filmstrip 34 in the film cartridge 30 is partly exposed.

As described above, the new type of film cartridge has various novel features, such as a magnetic information recording and reproducing feature, in addition to features of the conventional film cartridge. Further, the new type of film cartridge enables photographers not only to visibly recognize the exposed state of the filmstrip 34 preserved therein even if the filmstrip 34 is exposed, fully or partly, or has been photo-processed, but also to use different types of films by turn with a single camera of the APS type, which is hardly realizable by the conventional DX-code system film cartridges.

In cases where the new type of film cartridge is used together with a conventional camera, when the film cartridge with a partly unexposed filmstrip 34 contained therein is reloaded in the conventional camera, it is impossible to read the magnetically recorded information on the magnetic tracks of the filmstrip 34, and the features accompanying the new type of film cartridge, such as automatic positioning of a first unexposed film frame of the filmstrip 34, are not applicable.

In order for a camera for use with the new type of film cartridge to read magnetically recorded information on the magnetic tracks, it is necessary to incorporate a highly sensitive and highly precise magnetic head which is generally large in size and needs its associated parts and elements including complicated circuits and operation switches. While it may be possible to enter an ID No. of a film cartridge into the camera without using such a magnetic head, entering an ID No. of a film cartridge whenever the film is intentionally rewound halfway imposes a somewhat troublesome operation on the photographer when rewinding a film halfway for the purpose of photo-processing.

While the film cartridge containing a film with film frames partly unexposed is visually recognized to be partly exposed and partly unexposed through the VEI, it is not known how many unexposed film frames the film in the cartridge has unless the film cartridge is loaded in the camera. Loading and unloading a film cartridge in a camera so often is undesirable in view of durability.

SUMMARY OF THE INVENTION

It is an object of the present invention to provide a photographic camera in which a film with film frames partly exposed and partly unexposed in a film cartridge loaded in the camera is automatically withdrawn until a first unexposed frame is placed in a specified position, such as a camera exposure frame.

It is another object of the invention to provide a photographic camera which enables a photographer to recognize the number of unexposed film frames of a film in a cartridge which has once been loaded in and unloaded from the photographic camera.

The above objects of the invention are accomplished by providing a photographic camera for use with a film cartridge which has a halfway film rewind mode selected when rewinding a film with film frames thereof partly unexposed into the film cartridge. The photographic camera has data entry means for entering data relating to a film cartridge loaded into the photographic camera when the photographic camera remains set in the halfway rewind mode. The film cartridge data is stored correspondingly with data of the number of unexposed film frames of the film which is rewound halfway with film frames partly exposed and partly unexposed in a memory when the photographic camera is in the halfway rewind mode.

The photographic camera may be automatically enabled to enter data in response to rewinding the film into the film cartridge in the halfway film rewind mode and disabled when the photographic camera is out of the halfway film rewind mode.

According to another aspect of the invention the photographic camera stores the cartridge data entered through the data entry means and data of a number of unexposed film frames of said film in said film cartridge correspondingly with each other in the memory and, when set to a data selection mode, retrieves a data pair of cartridge data and data of a number of unexposed film frames and displays the data pair for visual observation.

The photographic camera may further clear the data pair displayed for visual observation from the memory.

BRIEF DESCRIPTION OF THE DRAWINGS

Above and other objects and features of the invention will be understood from the following description relating to specific embodiments thereof when reading in conjunction with the accompanying drawings, in which.

DETAILED DESCRIPTION OF THE SPECIFIC EMBODIMENT

Figure 1:
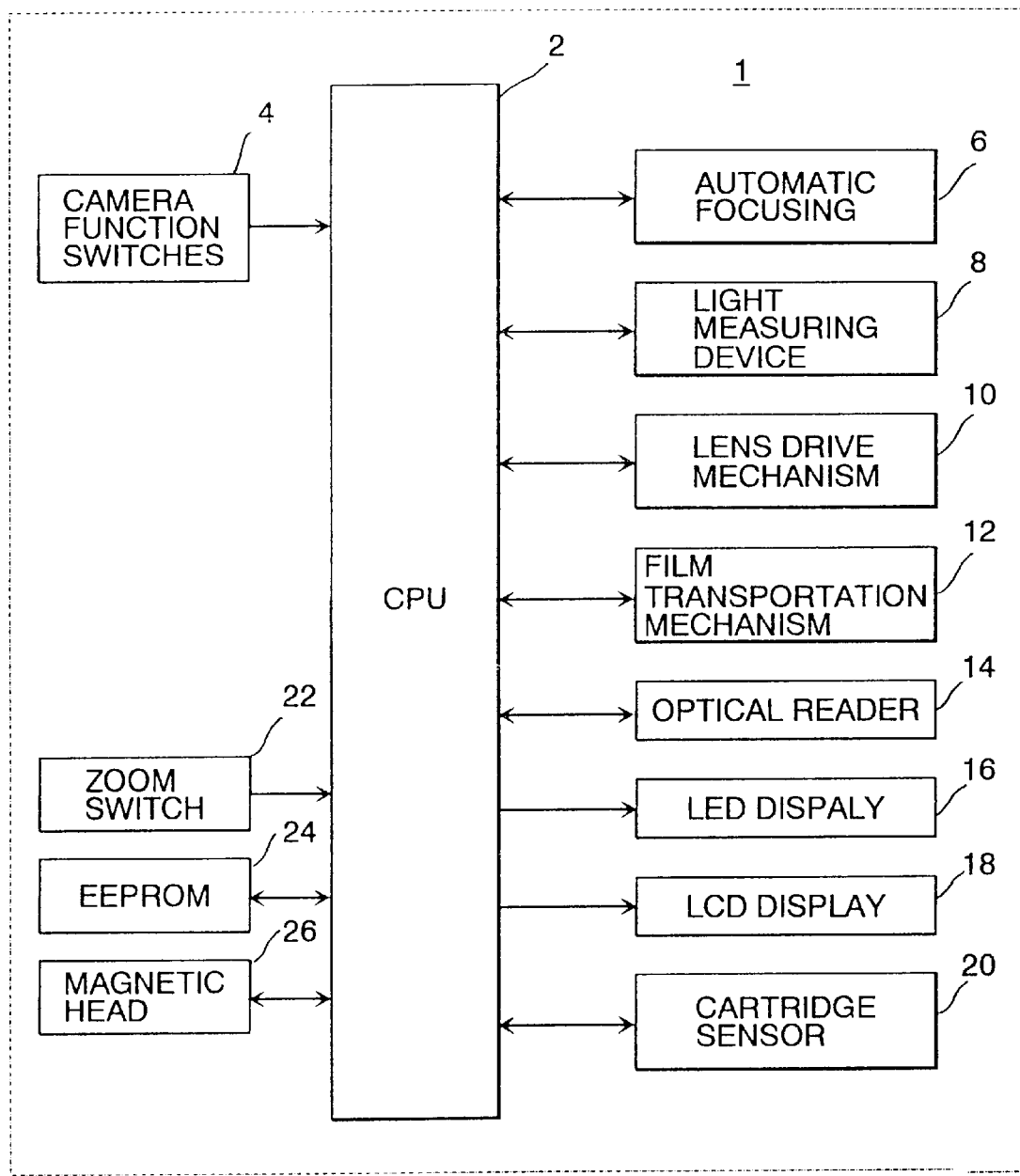
FIG. 1 is a functional block diagram showing a photographic camera.
Figure 2:
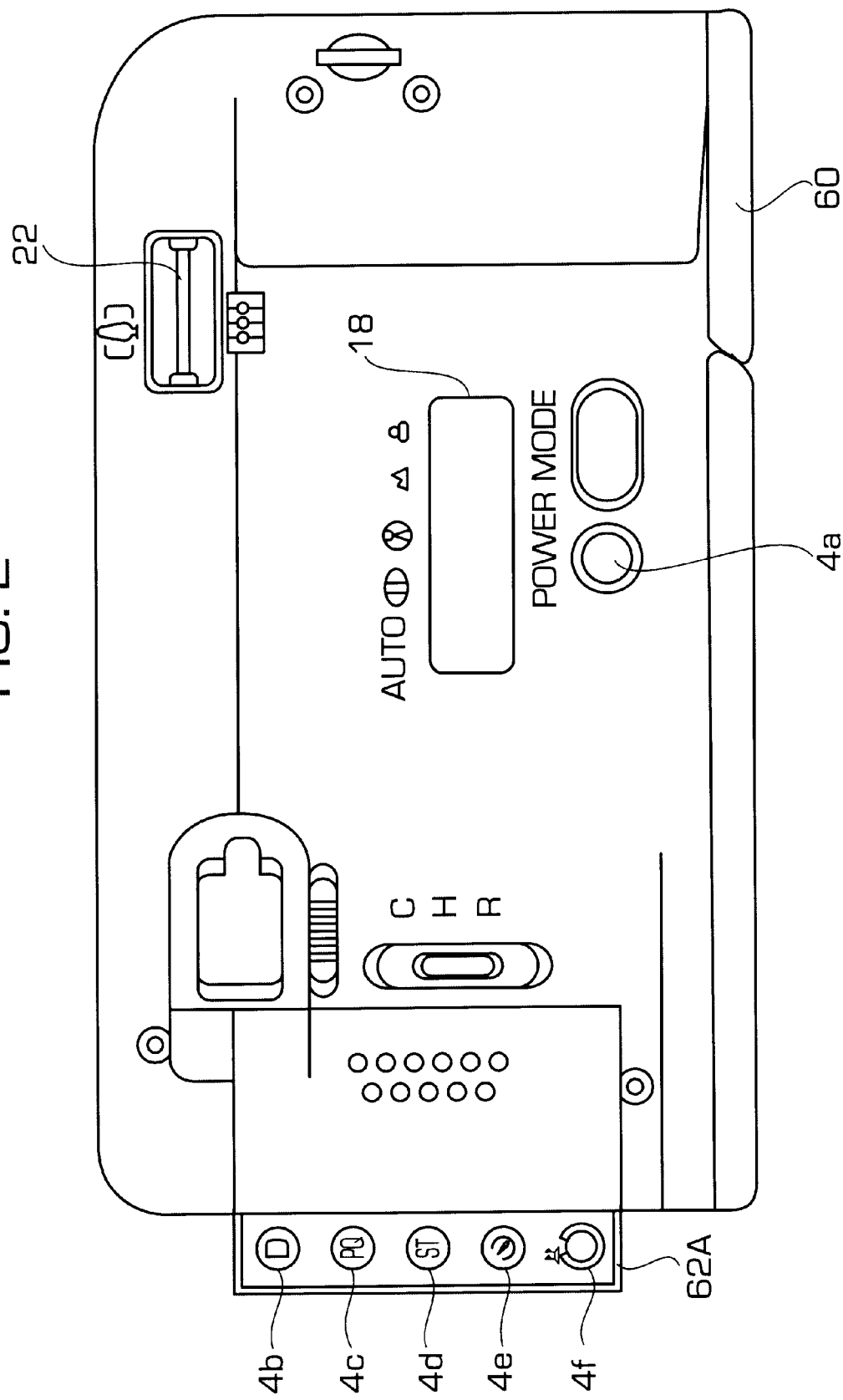
FIG. 2 is a rear view of the photographic camera in accordance with an embodiment of the invention.
Figure 12A:
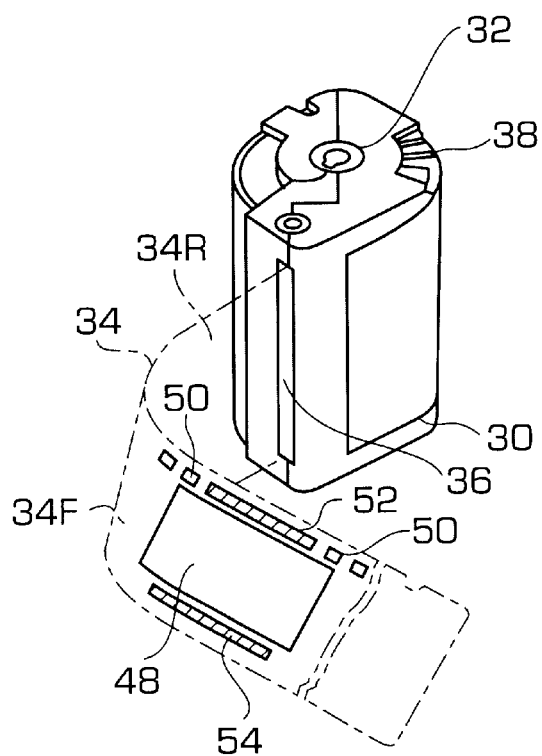
FIG. 12A is a perspective view of a new standard of film cartridge with a filmstrip partly withdrawn.
Figure 12B:
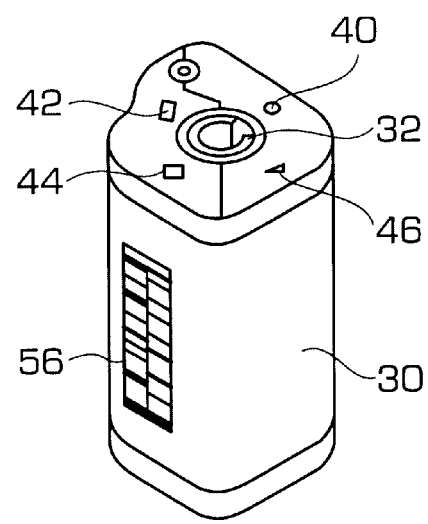
FIG. 12B is a perspective view of the new standard of film cartridge with a bar code of an ID No. printed thereon.

Referring to FIGS. 1 and 2, there is shown photographic camera in accordance with an embodiment of the invention which is loaded with a film cartridge 30 as shown in FIGS. 12A and 12B. The camera has various switches such as a power switch 4a, a data display switch (D) 4b, a copy number entry switch (PQ) 4c, a title selection switch (ST) 4d, a self-timer switch 4e, and a halfway film rewind command (MR) switch 4f, installed to the inside of a switch door 62. When the switch door 62 is opened the photographer has direct access to the switches 4b–4f. The data display (D) switch 4d is operated to select data display modes, such as, for example, a data display mode and an ID number entry mode. The copy number entry (PQ) switch 4c is operated to enter the number of prints, magnetic data of which is recorded on one of the magnetic tracks 48 and 52. The title selection (ST) switch 4d is operated to select prepared titles, magnetically readable data of which are recorded on one of the magnetic tracks 48 and 52. Further, these switches 4b, 4c and 4d are also operated to enter or otherwise select an ID number (ID No.) of the film cartridge 30 when the data display (D) switch 4d is previously operated to select the ID No. entry mode. The halfway film rewind command (MR) switch 4f is operated to rewind the filmstrip 34, compulsorily or intentionally, into the interior of the film cartridge 30 when the filmstrip 34 is exposed halfway and cause the visual exposure index (VEI) system to align the white indicator with the semicircular cut-out 46 so as to effect an indication that the filmstrip 34 is partly exposed. Rewinding a filmstrip 34 is allowed only when the data display (D) switch 4d is previously operated to select the ID number entry mode.

The camera has a central processing unit (CPU) 2 comprising a microcomputer for governing and controlling programmed camera operation. The CPU 2 receives signals from a row of switches 4 including a power switch 4a, a shutter release switch, a film rewind switch, date setting switches, exposure condition selection switches, etc. Further, the CPU 2 transfers signals from and to various functional elements and mechanisms, such as an automatic focusing mechanism 6, a photometric unit 8, a lens drive mechanism 10, a film winding and unwinding mechanism 12, an optical reader 14, a light emitting display device (LED) 16, a liquid crystal device (LCD) 18, a cartridge sensor 20, a zoom switch 22, and EEPROM 24. Specifically, the automatic focusing mechanism 6 operates in response to depression of the shutter release switch to detect a subject distance and drive a zoom lens (not shown) according to the subject distance so as to focus the taking lens (not shown) on the subject. The photometric unit 8 detects illuminance of the subject. The lens drive mechanism 10 operates in response to a signal generated by operation of the zoom switch 22 to drive the zoom lens for zooming. The film winding and unwind mechanism 12 unwinds the filmstrip 34 off from the spool 32 and advance it until a first unexposed film frame reaches a camera exposure frame (not shown) of the camera and winds the filmstrip 34 onto the spool 32. The optical reader 14 reads optically readable data, such as the bar codes, on the data disk 38 in response to an instruction signal from the CPU 2. The LED 16 is energized to effect a visual indication of exposure being completed. Various information on the film and camera such as various flag data necessary to control camera operation, an ID No. of a film cartridge 30 loaded in the camera, a film speed of the filmstrip 34 of the film cartridge 30, the number of available exposures, are written in and read out from EEPROM 24.

The LCD display 18, which is installed to the back of the camera, displays visual information such as a selected camera operation mode, a time, a date (year/month/day), exposure conditions, etc. when it is in the data display mode or an ID No. of a film cartridge 30 manually entered by the photographer or one of prepared ID Nos. selected by the operator when it is in the ID No. entry mode.

The bottom door 60 at the bottom of a cartridge chamber (not shown) inside the camera body is opened to permit a film cartridge 30 to be loaded and unloaded. The cartridge sensor 20 in the cartridge chamber is caused to effect in cooperation with the closing of the bottom door 60 and provides a control unit 2 with a signal indicting that the camera is loaded with a film cartridge 30.

Operation of the camera depicted in FIGS. 1 and 2 is best understood by reviewing FIGS. 3, 6, 8 and 9, which are flow charts illustrating various routines for the microcomputer of the CPU 2. Programming a computer is a skill well understood in the art. The following description is written to enable a programmer having ordinary skill in the art to prepare an appropriate program for the microcomputer for the CPU 2.

Figure 3:
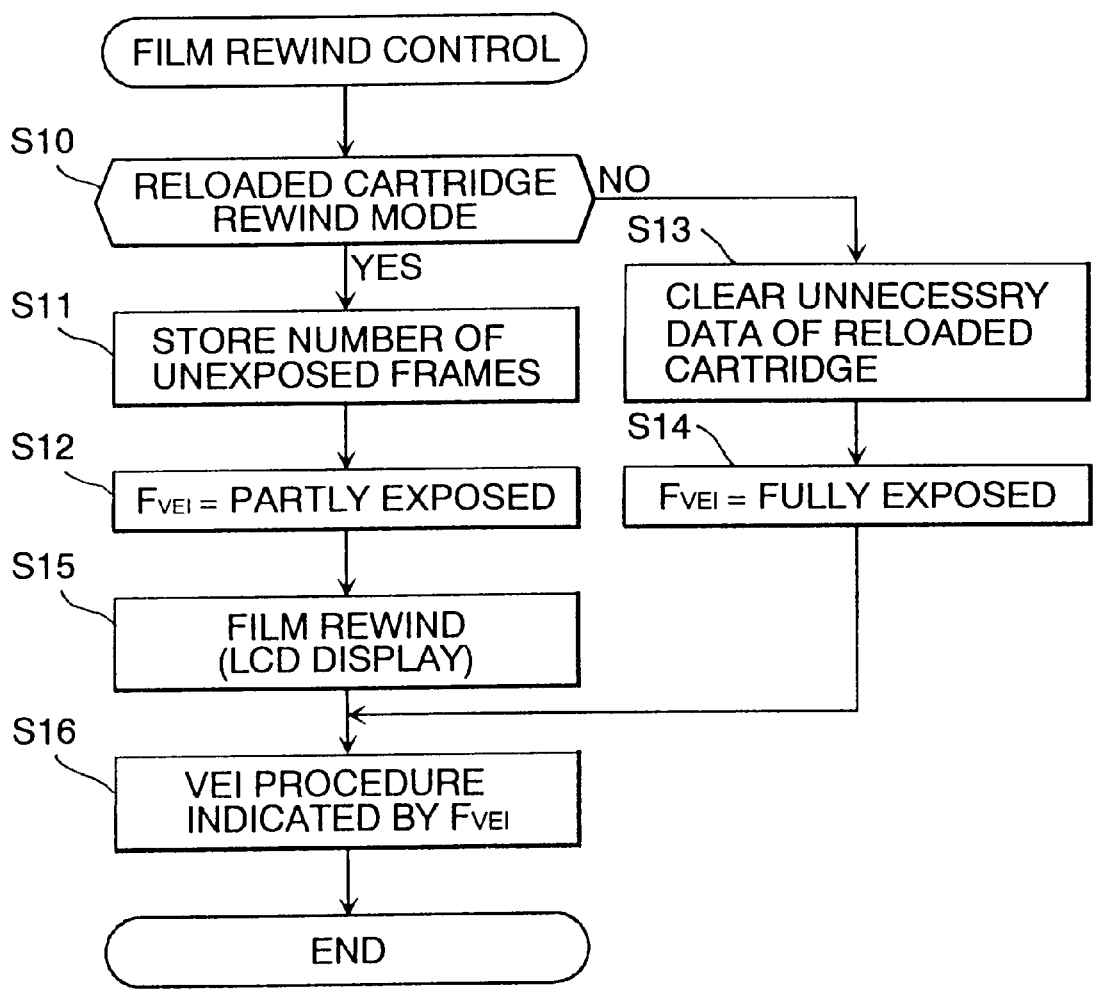
FIG. 3 is a flow chart illustrating a halfway film rewind sequence routine.

Referring to FIG. 3, which is a flow chart of the intentional halfway rewind sequence routine, it will be recalled from the previous description of FIGS. 1 and 2 that rewinding a filmstrip 34 is allowed only when the data display (D) switch 4d is previously operated to select the ID No. entry mode. When the photographer intends to unload the film cartridge 30 from the camera even though the filmstrip 34 remains partly unexposed, the data display (D) switch 4d is necessarily operated to select the ID No. entry mode prior to operation of the halfway film rewind command (MR) switch 4f.

The flow chart logic commences when the halfway film rewind command (MR) switch 4f is operated and control passes directly to a functional block at step S10 where a determination is made as to whether the camera is altered to the ID No. entry mode. When the camera is in the ID No. entry mode, i.e. the answer to the determination is "YES," then, the number of available or unexposed film frames of the filmstrip 34 in the film cartridge 30 in the camera is memorized in EEPROM 24 at step S11, and an exposure index flag $F_{VEI}$ is set to a state of "PARTLY EXPOSED" at step S12. On the other hand, when the camera is in a mode other than the ID No. entry mode, i.e. the answer to the determination is "NO," data relating to information on the film cartridge 30 stored in the EEPROM 24 is erased at step S13, and the exposure index flag $F_{VEI}$ is set to a state of "FINISHED" at step S14. The index flag $F_{VEI}$ effects an indication that the filmstrip 34 in the film cartridge 30 loaded in the camera is partly exposed and partly unexposed when set to the state of "PARTLY EXPOSED," or an indication that the filmstrip 34 in the film cartridge 30 loaded in the camera is fully unexposed and has no available film frame when set to the state of "FINISHED." After setting the exposure index flag $F_{VEI}$ to either one of the states at step S12 or S14, the film winding and unwind mechanism 12 is caused to rewind the filmstrip 34 into the film cartridge 30 at step S15. Under rewinding the filmstrip 34, the LED 16 is energized to display an indication of "FINISHED" or "PARTLY EXPOSED" according to the state of the exposure index flag $F_{VEI}$ set at step S12 or S14. Further, the LCD display 18 is energized to display a current frame number in the camera exposure frame, which is assigned figures for counting exposures, during rewinding the filmstrip 34 and a sign of "E" effecting an indication that the filmstrip 34 is completely rewound into the film cartridge 30. Finally, at step S16, the visual exposure index (VEI) system is caused in response to completion of rewinding the filmstrip 34 into the film cartridge 30 to align the white indicator with one of the cut-outs 40, 42, 44 and 46 so as to effect an indication according to the state of the exposure index flag $F_{VEI}$ set at step S12 or S14.

Thereafter, when the bottom door 60 is opened and the film cartridge 30 is unloaded from the camera, the cartridge sensor 20 sends to the CPU 2 a signal indicating that the film cartridge 30 is removed. In case where the film cartridge 30 is removed while the camera is in the ID No. entry mode, a process for entry of the ID No. of the removed film cartridge 30 takes place as will be described later.

Figure 4:
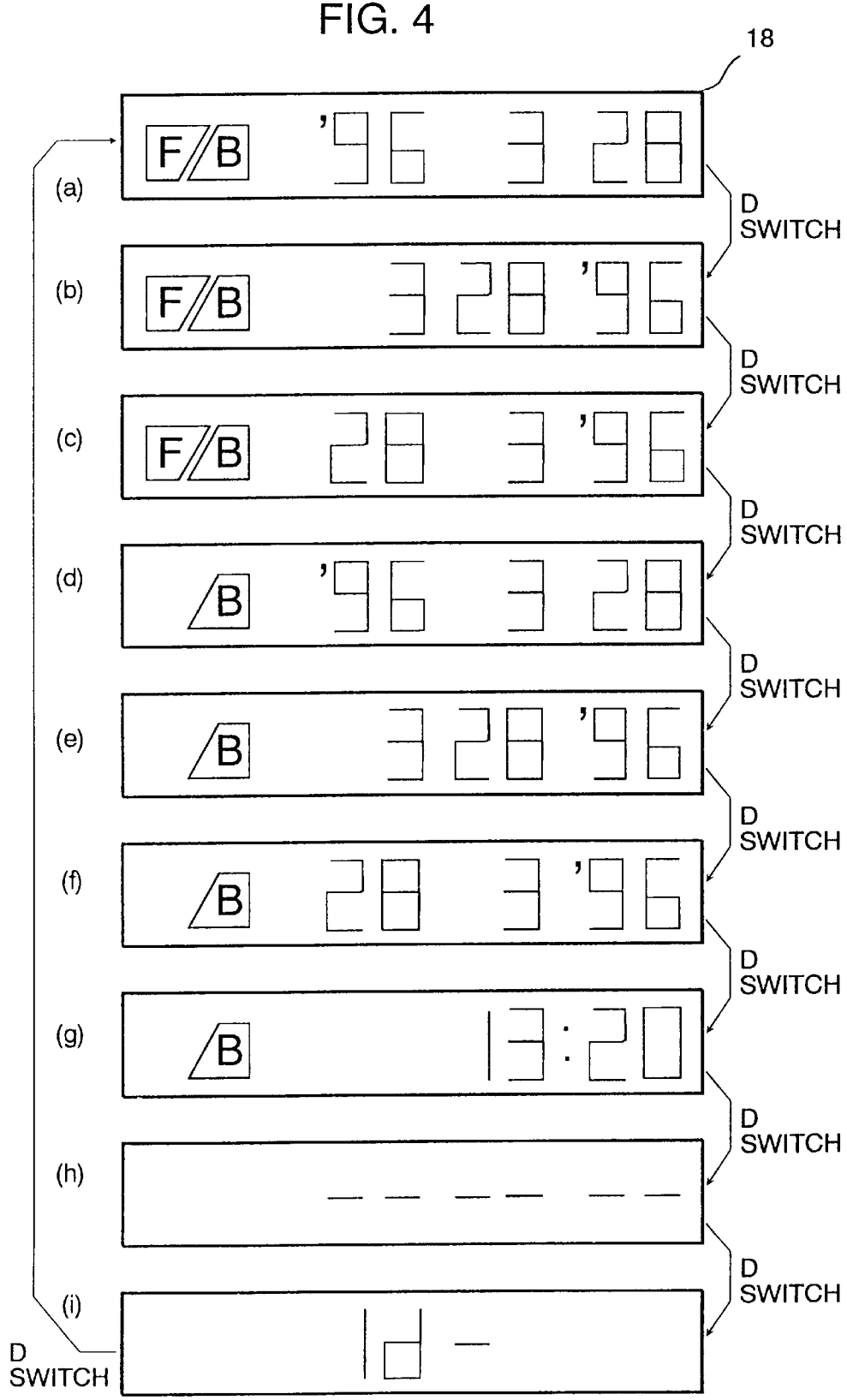
FIG. 4 is an illustration showing a LCD display in an ID data entry mode.

FIG. 4 is an explanatory illustration showing a process of altering display modes including an ID No. entry mode by means of the LCD display 18. As shown in the figure, the LCD display 18 has nine data-display modes, namely six different date display modes (a)–(f), a time display mode (g), a blank mode (h), and an ID No. entry mode. In detail, the LCD display 18 displays a date of "year-month-day" in this order in the date display mode (a) and in the date display mode (d), a date of "month-day-year" in this order in the date display mode (b) and in the date display mode (e), a date of "day-month-year" in this order in the date display mode (c) and in the date display mode (f). The date displayed on the LCD display 18 in any one of the date display modes (a)–(f) is recorded on one of the magnetic tracks 48 and 52 whenever an exposure is made and is printed on the back of a print when printing the filmstrip 34. The LCD displays a time of "hour-minute" in this order in the time display mode (g). The time displayed on the LCD display 18 in the time display mode (g) is printed on the back of the print. However, the LCD displays nothing in the blank mode (h). Further, the LCD in the ID No. entry mode (i) displays a sign of "ID" giving the photographer an indication that the camera is in the ID No. entry mode. Selection of the display modes (a)–(i) of the LCD is made through the data display (D) switch 4d. Specifically, the LCD display 18 circularly alters its display mode in order from the side of date display mode (a) toward the side of ID No. entry mode (i) whenever the data display (D) switch 4d is repeatedly pushed. For example, the LCD display 18, which displays a date in the date display mode (a) at present, alters its display mode to the date display mode (b) when the data display (D) switch 4d is pushed once, to the date display mode (c) skipping over the date display mode (b) when the data display (D) switch 4d is pushed twice, to the blank mode (h) skipping over the display modes (b)–(f) and the time display mode (g) when the data display (D) switch 4d is pushed seven times in succession. The LCD display 18 set in the blank mode (h) at present alters its display mode to the ID No. entry mode (i) when the data display (D) switch 4d is pushed once, and to the date display mode (b) skipping over the date display mode (a) when the data display (D) switch 4d is pushed three times in succession. In such a manner, the LCD display 18 alters its display mode one by one whenever the data display (D) switch 4d is pushed. Accordingly, the LCD display 18 alters its display mode to the ID No. entry mode (i) by pushing the data display (D) switch 4d the No. of times corresponding to the number of modes between the ID mode to a display mode selected at present. Selective display modes is not necessarily restricted in number and display order to those of the above embodiment shown in FIG. 4.

Figure 5:
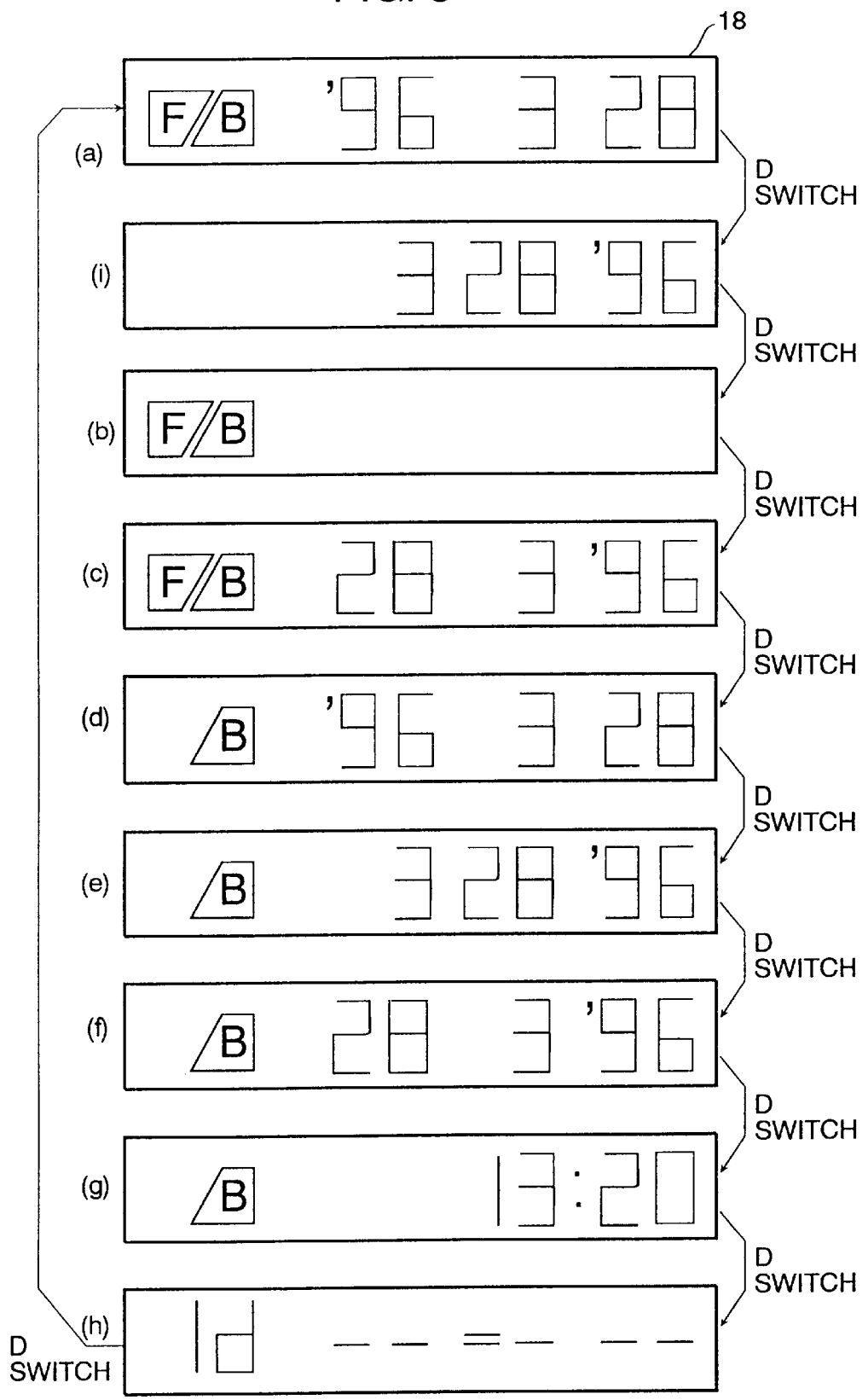
FIG. 5 is an illustration showing a variation of the LCD display in an ID data entry mode.

FIG. 5 is an explanatory illustration showing another process of altering the display modes including the ID No. entry mode by means of the LCD display 18. In this embodiment, the ID No. entry mode (i) is arranged between the date display modes (a) and (b). The LCD display 18 circularly alters its display mode in order from the side of date mode (a) toward the side of blank mode (h) via the ID No. entry mode (i) whenever the data display (D) switch 4d is repeatedly pushed. A single operation of the data display (D) switch 4d causes an alteration of the display mode from one to another arranged immediately after the one. If the LCD display 18 displays the blank mode (h), operation of the data display (D) switch 4d is made with the result of an alteration to the date display mode (a).

As described above, even a date is displayed in any display mode, A first operation of the data display (D) switch 4d brings the LCD into the ID mode, and subsequent operation of it changes the LCD display 18 in the date display mode differently. Accordingly, with this type of circulation of date display modes including the ID No. entry mode, the photographer is provided with a convenience, as compared with the date display procedure, that only single operation of the data display (D) switch 4d is required to set the camera to the ID No. entry mode.

Figure 6:
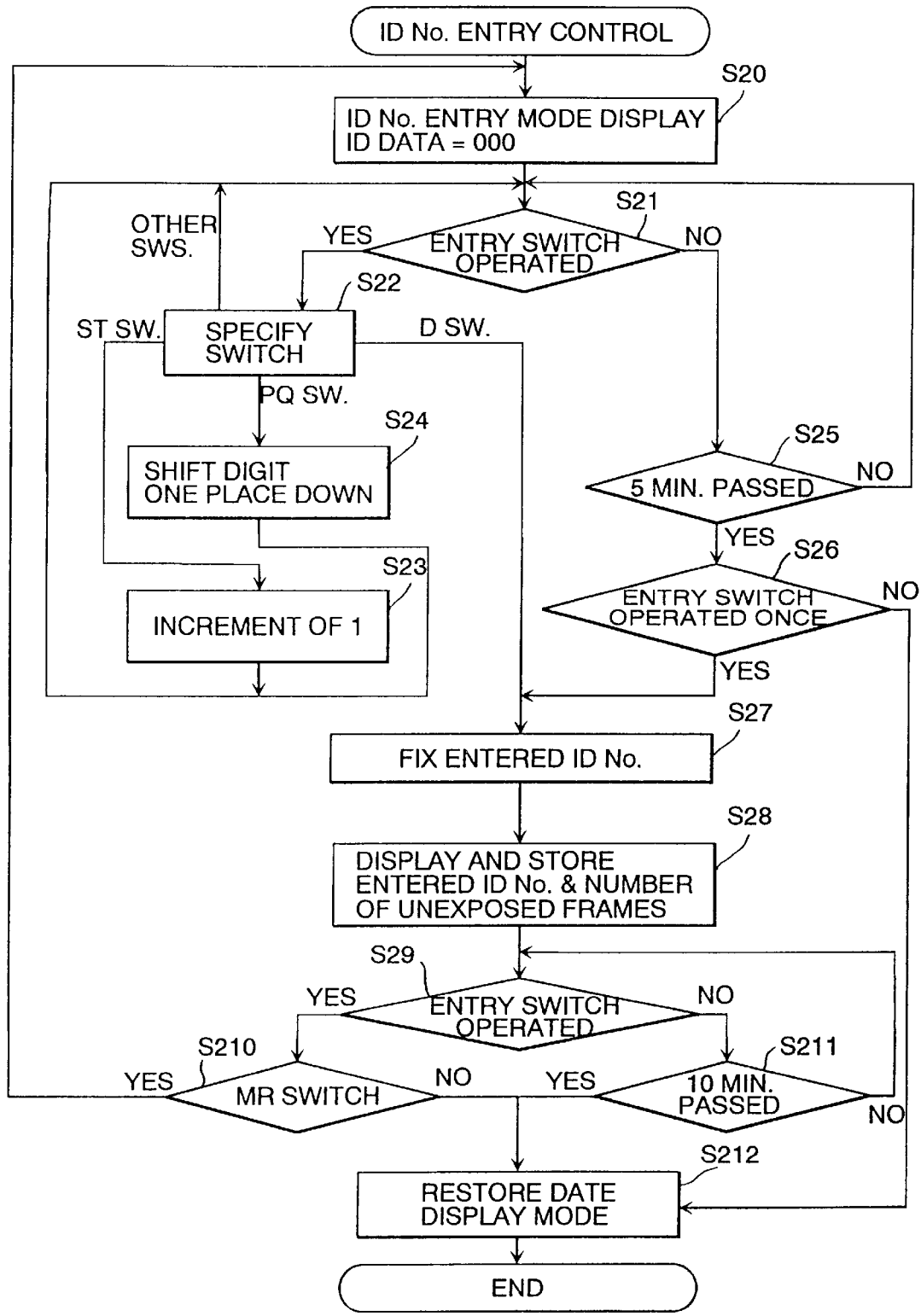
FIG. 6 is a flow chart illustrating an ID No. entry sequence routine.

FIG. 6 is a flow chart of the ID No. entry sequence routine which commences in response to removal of the film cartridge 30 in which the filmstrip 34 exposed halfway is rewound on the spool 32 while the LCD display 18 displays the ID No. entry mode. When the flow chart logic commences and control passes directly to a functional block at step S20 where the camera switches to the ID No. entry mode and clearing the ID No. previously entered. Subsequently, at step S21, a determination is made as to whether any one of the switches 4b, 4c and 4d effective to entering, or otherwise selecting, an ID No. of the film cartridge 30 is pushed. While the camera is in the ID No. entry mode, it does not perform any operation other than ID No. entry operation even when any one or more of the switches included in the row of switches 4 and the zoom switch 24 is operated. While identification of the film cartridge 30 is made by entering all figures of the ID No. indicated on the film cartridge 30, it can be permitted to identify the film cartridge 30 by a lower part of the ID No., for example a number for the lower three figures, according to the number of figures that LCD display 18 is able to display. Further, the film cartridge 30 may be identified by a number personally assigned by the photographer.

Subsequently, when any one of the switches 4b, 4c and 4d effective to ID No. entry is pushed, i.e. when the answer to the determination is "YES," then, a switch which is pushed is specified at step S22. When the title selection (ST) switch 4d is pushed once, a number of the ID No. at a place to be altered is changed by an increment of 1 (one) at step S23. On the other hand, when the copy number entry (PQ) switch 4c is pushed once, a figure at which a part of the ID No. is to be altered is shifted one place up at step S24. After altering the part of the ID No. or shifting a figure at which the ID No. is to be altered, another determination concerning the ID No. entry switches 4b–4d is made at step S21. When the data display (D) switch 4d is pushed, the altered ID No. is fixed to complete the ID No. entry.

On the other hand, when none of the ID No. entry switches 4b, 4c and 4d is pushed, i.e. when the answer to the determination is "NO," then, a determination is made at step S25 as to whether a specified period of time, for example approximately five minutes, has passed without operation of the ID No. entry switches 4b, 4c and 4d. When the answer to the decision is "NO," another determination concerning the ID No. entry switches 4b–4d is made at step S21. On the other hand, when the answer to the decision is "YES," a determination is made at step S26 as to whether any one of the ID No. entry switches 4b, 4c and 4d is pushed even only once after the camera has been brought into the ID No. entry mode. When the answer to the decision is "YES," after fixing the ID No. entered at step S27, the fixed ID No. and the number of available or unexposed film frames are memorized in EEPROM 24 at step S28. Subsequently, a determination is made at step S29 as to whether any one of the ID No. entry switches 4b, 4c and 4d is pushed again. If the answer to the decision is "YES," then, a determination is further made at step S210 as to whether the halfway film rewind command (MR) switch 4f is pushed. When the halfway film rewind command (MR) switch 4f is pushed, after clearing the ID No. previously entered, the flow chart logic returns to the first functional block at step S20 to stand ready for another ID No. entry. On the other hand, when the answer to the decision is "NO," this indicates that a switch other than the halfway film rewind command (MR) switch 4f is pushed, then, the LCD display 18 is altered to the display mode previously selected at step S212. When the answer to the determination concerning operation of the ID No. entry switches 4b–4d made at step S29 is "NO," after a lapse of a specified period of time, for example approximately 10 seconds, which is determined at step S211, the LCD display 18 is altered to the previously selected display mode at step S212. As apparent, when there is no operation of the ID No. entry switches 4b–4d after fixing and memorizing the ID No., the display LCD dispaly 18 is altered to the previously selected display mode at step S212 only at a lapse of the specified period of 10 seconds.

When the answer to the determination concerning operation of any one of the ID No. entry switches 4b, 4c and 4d made at step S26 is "NO," the flow chart logic proceeds directly to step S212.

Whenever the LCD display 18 returns to the previously selected display mode, the flow chart logic concludes the ID No. entry sequence routine.

Figure 7:
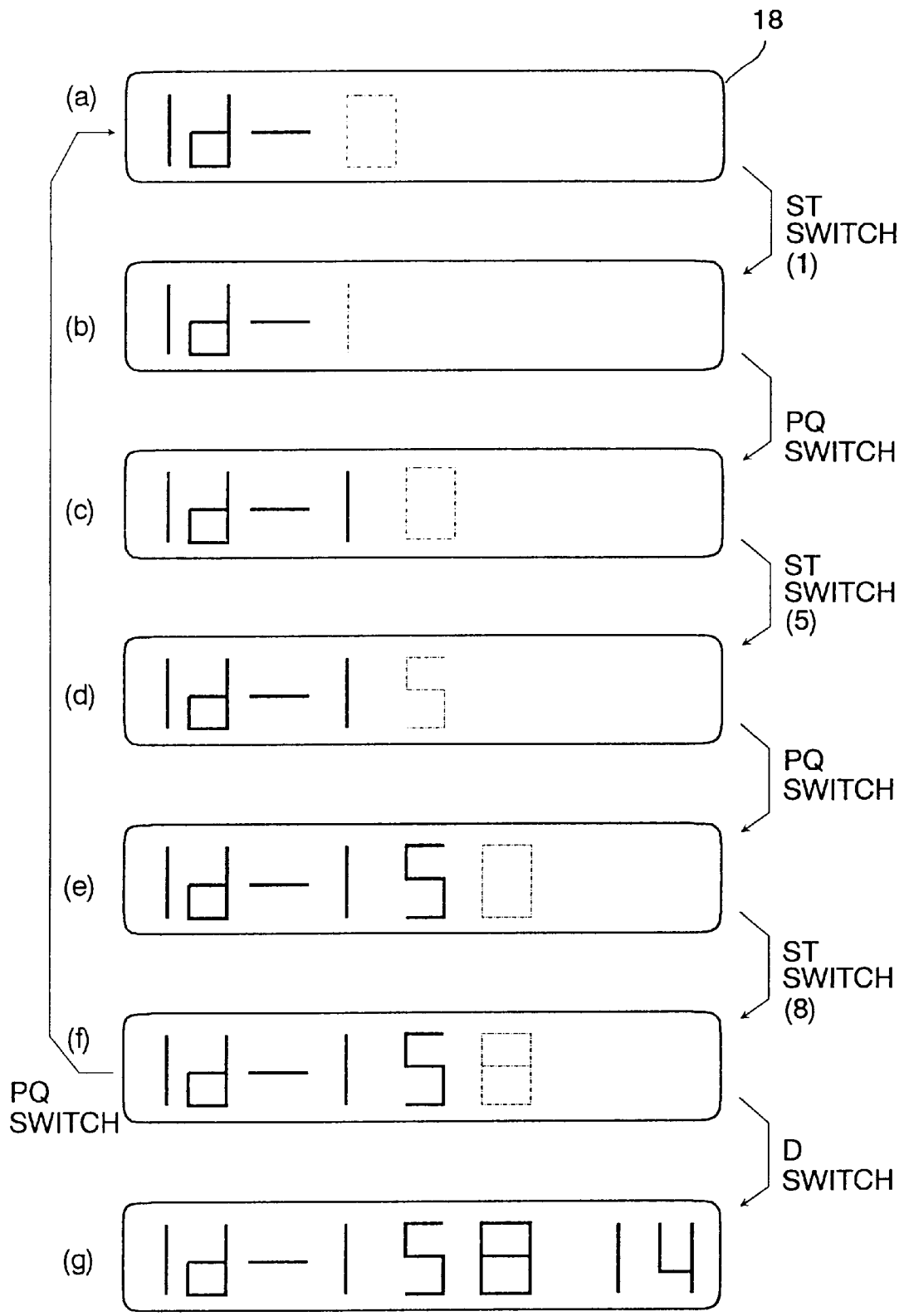
FIG. 7 is an illustration showing the LCD display during ID data entry operation.

FIG. 7 is an explanatory illustration showing a process of ID No. entry through the LCD display 18. As depicted in the figure, a six-digit number for primarily displaying a date is assigned to enter an ID No. The following description will be directed to a case where an ID No. of "158" is entered, by way of example.

Immediately after the ID No. entry sequence routine commences, the LCD display 18 displays a sign of "Id -" indicating that the camera is ready for ID No. entry and the number "0" blinking at the uppermost figure, namely the sixth figure (which is the third figure for the three-digit ID No.), in a display mode (a). In the display mode (a) where the number "0" blinks, the LCD display 18 is ready to enter any single digit number at a place of figure where the number "0" blinks. In order to enter a third digit number for the ID No., the title selection (ST) switch 4d is pushed as many times as the third digit number. For example, when entering a number "6," the title selection (ST) switch 4d has to be pushed six times. In this example, in order to enter a number "1" for the third digit number of the ID No. "158," the title selection (ST) switch 4d is pushed once. At this time, the LCD display 18 is in a display mode (b) where the entered number "1" appears in place of the number "0" and blinks. When the copy number entry (PQ) switch 4c is subsequently pushed once, the LCD display 18 is brought into a display mode (c) where, while the entered number "1" is provisionally fixed, the number "0" appears at a place of the second figure and blinks, which indicates that the LCD display 18 is ready to enter any single digit number for the second digit number of the ID No.

In the similar manner, the title selection (ST) switch 4d is pushed five times to display and blink a number "5" in place of the number "0" for the second digit number of the ID No. 158 on the LCD display 18 as shown in a display mode (d). Subsequently, the copy number entry (PQ) switch 4c is pushed once to bring the LCD display 18 into a display mode (e) where, while the entered number "5" is provisionally fixed, the number "0" appears and blinks at a place of the second figure and blinks, which indicates that the LCD display 18 is ready to enter any single digit number for the first digit number of the ID No. "158." Thereafter, when the title selection (ST) switch 4d is pushed eight times, then, a number "8" appears and blinks in place of the number "0" for the first digit number of the ID No. 158 on the LCD display 18 as shown in a display mode (f). Subsequently, when the copy number entry (PQ) switch 4c is pushed once, the LCD display 18 is brought back to the display mode (b) where, while a number "1" appears and blinks for another or corrective ID No. entry. The entry of an ID No. may be performed in reverse order from the lowest digit to the highest digit.

On the other hand, when the data display (D) switch 4d is pushed once, the LCD display 18 now in the display mode (f) is altered to a display mode (g) where the entered ID No. "158" is eventually fixed. In this display mode (f), the LCD display 18 displays the number of unexposed film frames, for example "14," at the lower two digits. As apparent from the display mode (g), the LCD display 18, which is able to display a six-digit number for a date, practically displays the sign "Id–", a three digit ID No. and an at most two digit number of unexposed film frames. These ID Nos. and their associated number of unexposed film frames are, on one hand, visually examined on the LCD display 18 by the photographer and, on the other hand, stored in EEPROM 24. Whenever clearing these numbers, the LCD display 18 is ready to display a date thereon.

Figure 8:
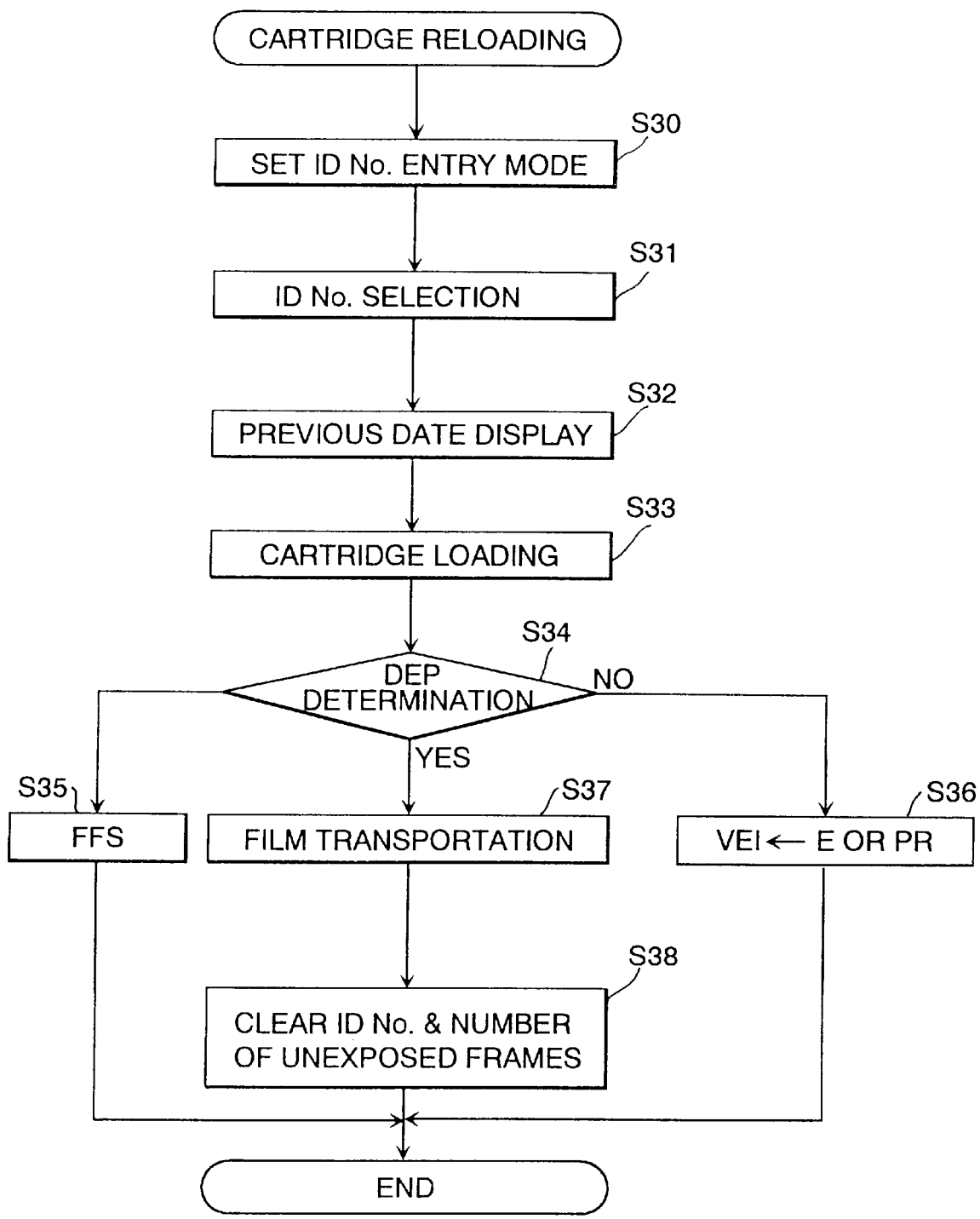
FIG. 8 is a flow chart illustrating a film cartridge reloading sequence routine.

FIG. 8 is a flow chart of the cartridge reloading sequence routine which is performed to load a film cartridge 30 with a filmstrip 34 partly exposed and rewound therein.

When the flow chart logic commences and control proceeds directly to a function block at step S30 where the camera is set to the ID No. entry mode in the manner of ID mode setting previously described with reference to FIGS. 4 and 5. After establishing the ID data entry mode in the camera, an ID No. which identify the film cartridge 30 intended to be reloaded is selected among the ID Nos. stored in the EEPROM 24 at step 32. The selection of an ID No. is performed through operation of the data display (D) switch 4d, the copy number entry (PQ) switch 4c and the halfway film rewind command (MR) switch 4f. Selective operation of these switches 4b, 4c and 4f causes CPU 2 to read out the ID Nos. and their associated numbers of unexposed film frames in order and to display and fix an ID No. and the number of unexposed film frames read out on the LCD display 18. During execution of the cartridge reloading sequence routine, command signals from the switches effecting camera operation, such as the shutter release switch, the zoom switch, etc., are ignored.

In cases where no operation of the switches occurs in a specified period of time, for example approximately five minutes, after the establishment of the ID No. selection mode, or a switch for removing the ID No. entry mode (not shown), if provided, is operated, the ID No. entry mode is removed. At this time, the LCD display 18 may display a date thereon. In such a case, even when the film cartridge 30 with the filmstrip 34 partly exposed and intentionally rewound therein, the camera does not perform automatic transportation of the filmstrip 34 to place the foremost unexposed film frame in the camera exposure frame.

After entering the ID No., the LCD display 18 restores and displays the date at step S32, and the camera is ready to be loaded with a film cartridge at step S33. When a film cartridge 30 is loaded and the bottom door 60 is subsequently closed, the cartridge sensor 20 detects the film cartridge 30. Then, a determination relating to double exposure prevention (DEP) is made at step S34. That is, the optical reader 14 reads information, such as the number of exposable frames, the speed or sensitivity of film, the type of film, and an exposure status (fresh or unexposed, partly exposed or fully exposed) from the film cartridge 30 in the camera 1. These data on the film cartridge 30 are stored in the EEPROM 24.

If the film 34 in the film cartridge 30 is unexposed (which is shown by a label "U" in FIG. 8), the film drive mechanism 12 is caused to automatically drive the film 34 until the foremost film frame 48 is placed in the camera exposure frame (Fast Frame Set: FFS) at step S35. If the film in the film cartridge 30 is fully exposed or fully exposed and processed (which is shown by a label "E, PR" in FIG. 8), the VEI (visual exposure index) is set to a position "E" (Exposed) or "PR" (Processed) at step S36. On the other hand, if the film in the film cartridge 30 is partly exposed (which is shown by a label "P" in FIG. 8), that is, the film has been rewound into the film cartridge before all of the film frames 48 are exposed at previous use, the film drive 12 transports the film 34 by a length according to the number of unexposed or available film frames 48 stored together with the ID No. of the film cartridge in the EEPROM 24 at step S37. The ID No. and the number of exposable film frames 48 in the EEPROM 24 is cleared after the transportation of the film 34. At the end of the camera operation at step S35, S36 or S38, the camera 1 is ready for operation.

When driving the film 34 until the first film frame 38 is placed in a specified position as well as during FFS operation, the LCD display 18 displays the speed of film in the date display area and clears an exposure count in the exposure count display area. The LCD display 18 displays the number of available or unexposed film frames 38 in the exposure count display area when the first film frame 48 reaches the specified position, and decrements the count by one whenever an exposure is made. During film transportation, it is prohibited to write magnetic information on the magnetic recording layer of the film 34 and clear the magnetic information on the magnetic recording layer of the film 34, and operation of the shutter release switch is ignored. If the number of unexposed film frames relating to the ID No. selected at step S31 exceeds the number of available film frames found during the DEP determination at step S34, the film drive at step S37 is skipped.

When loading a cartridge 30 with a fresh or unexposed filmstrip 34, the flow chart logic passes directly to the function block at step S33. In this case, the film is determined to be fresh through the DEP determination at step S34, and hence FFS film drive takes place at step S35 to automatically place the foremost film frame 48 in the camera exposure frame.

Figure 9:
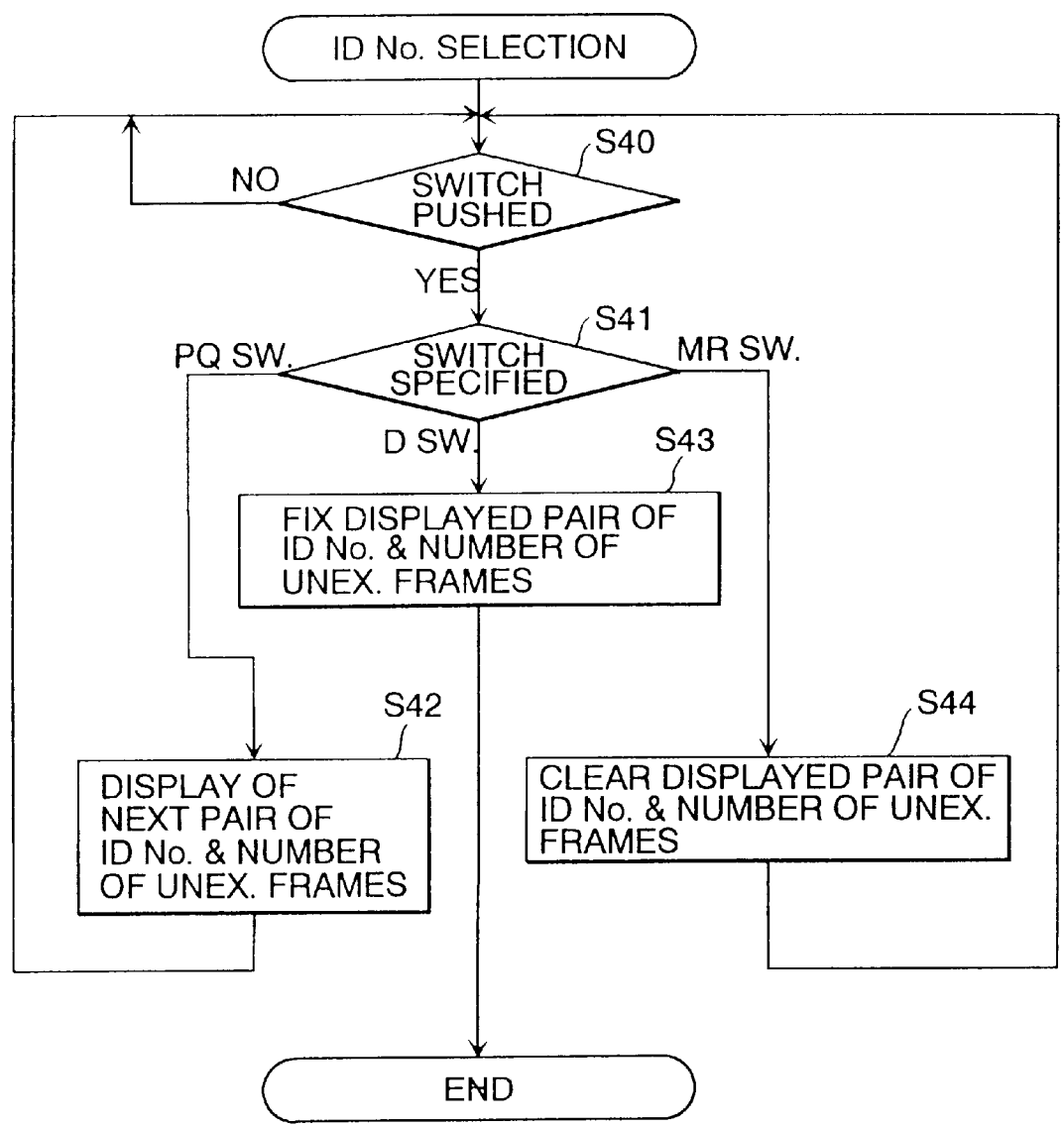
FIG. 9 is a flow chart illustrating an ID No. selection sequence routine.

FIG. 9 is a flow chart illustrating the ID No. selection subroutine made at step S31 in the flow chart in FIG. 8. When the flow chart logic commences and control proceeds directly to a function block at step S40 where a determination is made as to whether any one of the ID No. entry switches 4b, 4c and 4d is pushed. This determination is repeated until any one of the ID No. entry switches 4b, 4c and 4d is pushed. Subsequently another determination is made at step S41 as to whether which one of the ID No. entry switches 4b, 4c and 4F is pushed. When the copy number entry (PQ) (PQ) switch 4c is pushed, a second pair of the ID Nos. and the number of unexposed film frames are read out and displayed on the LCD display 18 at step S42, and the determination is subsequently made to wait for another operation of the ID No. entry switches at step S40. This is because, if the EEPROM 24 stores a plurality of pairs of ID Nos. and their associated numbers of unexposed or available film frames relating to the ID Nos., these pairs are read out in order one by one whenever the copy number entry (PQ) switch 4c is selected.

When it is determined at step S41 that the halfway film rewind command (MR) switch 4f is pushed, the EEPROM 24 clears the pair of ID Nos. and its associated number of unexposed film frames which are displayed in the LCD display 18 at step S43, and the determination is subsequently made to wait for another operation of the ID No. When it is determined at step S41 that the data display (D) switch 4b is pushed, the ID No. and its associated number of unexposed film frames displayed in the LCD display 18 are fixed at step S34.

Figure 10:
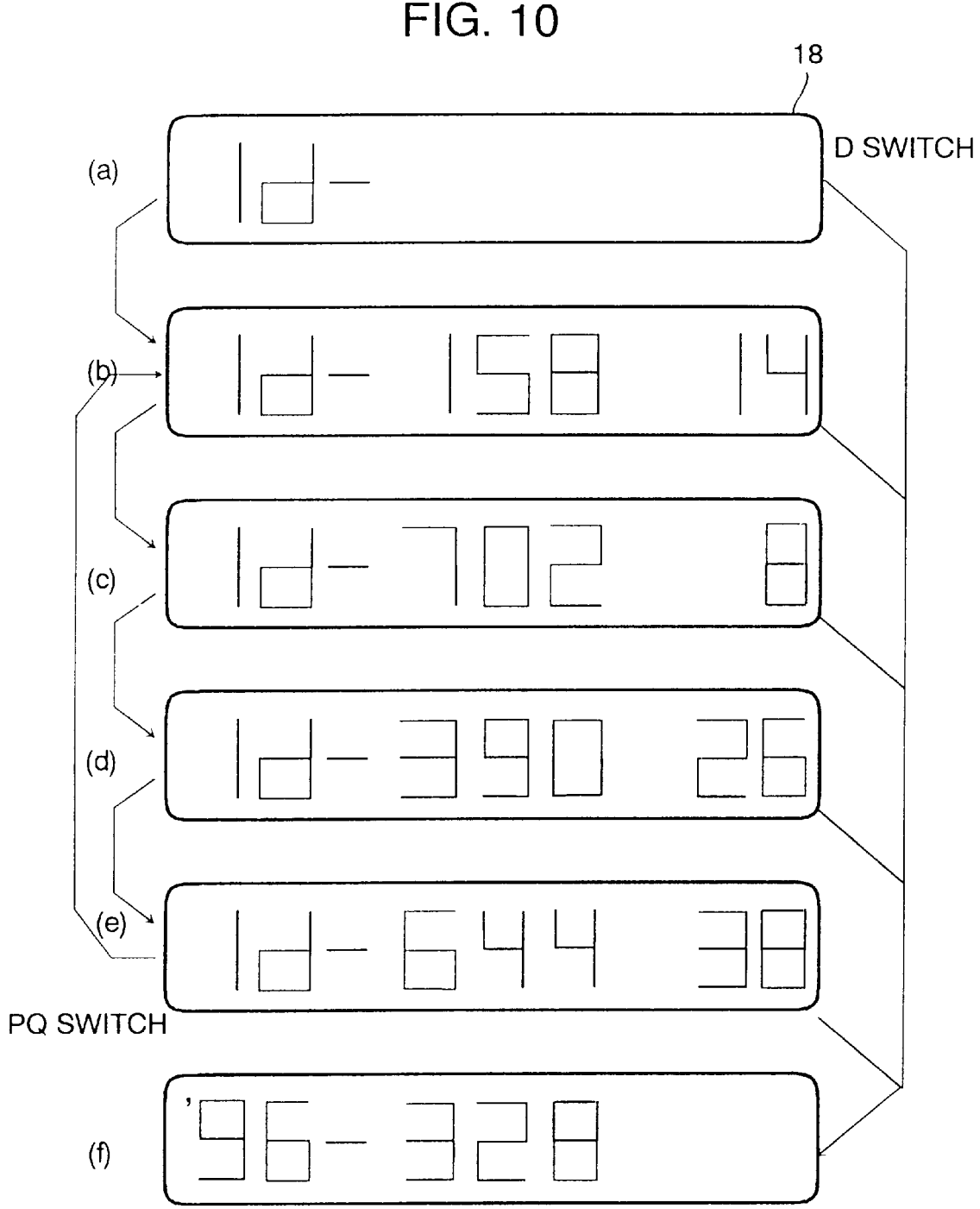
FIG. 10 is an illustration showing the LCD display during ID No. selection.

During the process of ID No. selection, the LCD display 18 takes two display modes as shown in FIG. 10. The LCD display 18 displays an ID No. in place of a six-digit number for a date and its associated number of unexposed film frames in place of an exposure count. The following description is directed to when EEPROM 24 stores four pairs of ID Nos. and its associated numbers of unexposed film frames.

Whenever the ID NO. selection subroutine commences, the LCD takes a preparatory mode (a) where the sign [Id -] indicating the ID entry mode. When the copy number entry (PQ) switch 4c is pushed, the LCD display 18 alters its display mode to a selection mode (b) to display a suggested pair of an ID No. and its associated number of unexposed film frames, for example the 158 and 14, respectively, which is the oldest storage. In the same manner, the LCD display 18 displays suggested pairs of ID Nos. and their associated numbers of unexposed film frames in order from old storage to new storage or vice versa in the EEPROM 24 as shown by selection modes (c)–(e). As long as the copy number entry (PQ) switch 4c is repeatedly pushed, the LCD display 18 displays these pairs of ID Nos. and their associated numbers of unexposed film frames in the same order.

Whenever the data display (D) switch 4b is pushed, the ID No. and its associated number of unexposed film frames displayed on the LCD display 18 at the time of operation of the data display (D) switch 4b are fixed and selected, and, immediately thereafter, the LCD display 18 alters its mode to the date display mode (c) to display a date in place of the ID No. and its associated number of unexposed film frames. A pair of an ID No. and its associated number of unexposed film frames selected once are cleared from the EEPROM 24.

During the process of ID No. selection, the halfway film rewind command (MR) switch 4f is operated with the result of intentionally clearing the ID No. and its associated number of unexposed film frames displayed on the LCD from the EEPROM 24.

Figure 11:
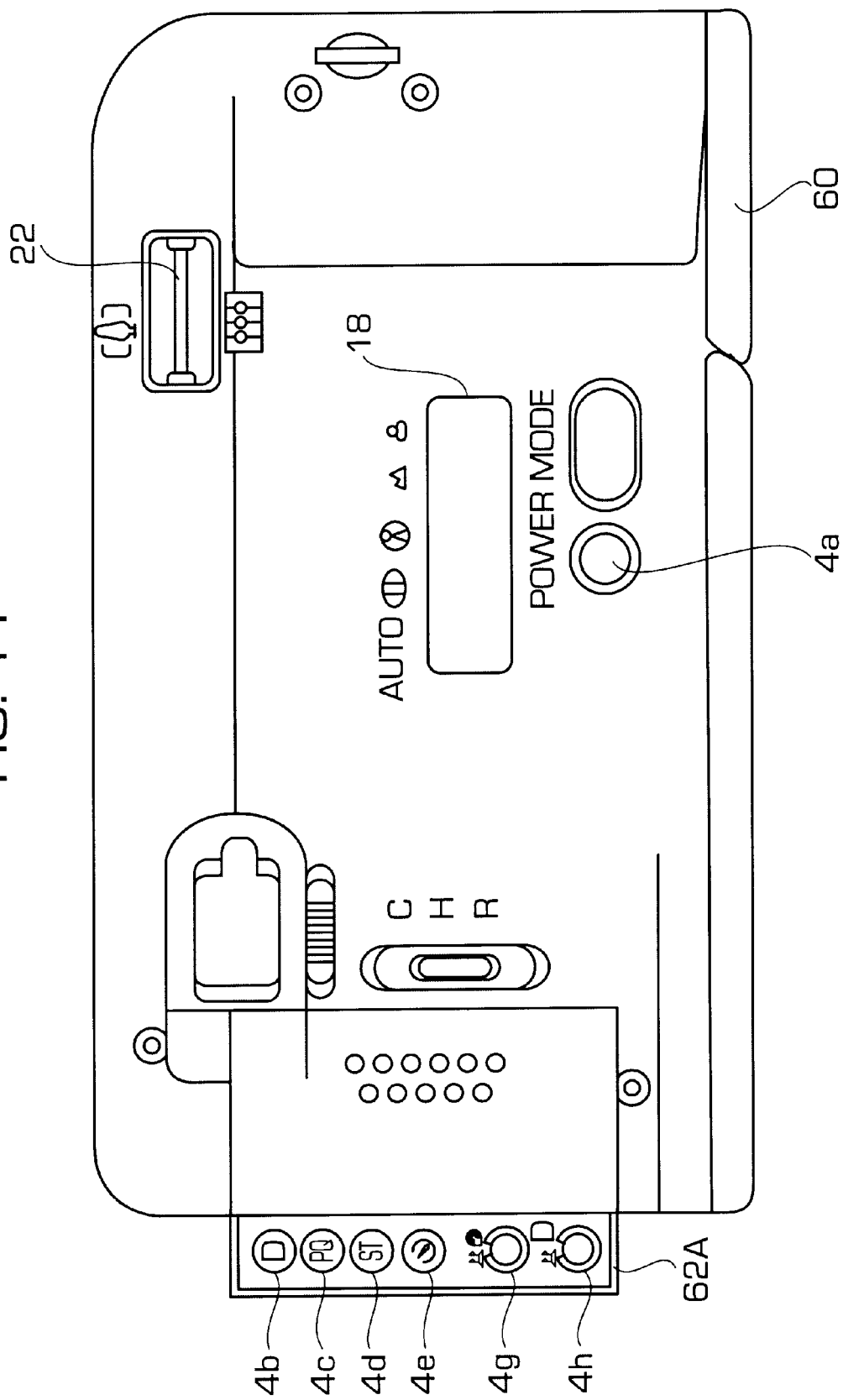
FIG. 11 is a rear view of the photographic camera in accordance with another embodiment of the invention.

While the ID No. entry mode is established in the camera through the variable date display system in the above embodiment, a special ID mode switch may be installed to the camera. As shown by way of example in FIG. 11, a halfway film rewind switch 4h is installed, separately from an ordinary rewind switch 4g, to a switch door 62A so that the camera is automatically set to the ID No. entry mode whenever the halfway film rewind switch 4h is pushed to intentionally rewind a film though the film is only partly unexposed.

As described above, the camera is set to the halfway rewinding mode (ID mode) always in concert with reloading a film cartridge with a film partly unexposed. In the halfway rewind mode, the camera picks up information on the film cartridge including an ID No. and stores the information corresponding to the number of unexposed film frames of the film in the film cartridge identified by the ID No. On the other hand, in the modes other than the halfway rewind mode, the camera does not pick up the information on the film cartridge. Accordingly, the camera always stores of a film cartridge and the number of unexposed film frames of a film intentionally rewound halfway into the film cartridge. The camera is enabled to transport the film by a length according to the number of unexposed film frames when the camera is loaded with the film cartridge. For films rewound halfway and intended to be photo processed, the camera is not prepared for ID No. entry, allowing the photographer to operate the camera problem free. Further, the camera has no use for information on the film, providing effective utilization of memory areas of the EEPROM 24.

Although the present invention has been described in detail by way of example with reference to the accompanying drawings, it is to be understood that many variants and modifications may occur to those skilled in the art. Such variants and modifications otherwise depart from the scope of the present invention, they are intended to be covered by the following claims.

What is claimed is:

1. A photographic camera for use with a film cartidge having film with a plurality of film frames and a halfway film rewind mode selected when rewinding the film with partly unexposed film frames, said photographic camera comprising:

mode setting means for setting the photographic camera to the halfway film rewind mode;

film drive means for driving the film into the film cartridge loaded in the camera when said camera is in said halfway rewind mode;

cartridge data entry means for entering a first data related to said film cartridge into the photographic camera when the photographic camera is set in said halfway rewind mode;

frame data detecting means for detecting a second data related to unexposed film frames of the film; and a memory for storing said first data, of said film cartridge entered through said data entry means, together with said second data corresponding to a number of unexposed film frames.

2. A photographic camera as defined in claim 1, wherein said data entry means is disabled when the photographic camera is not in said halfway film rewind mode.

3. A photographic camera as defined in claim 1, wherein said data entry means is automatically enabled to enter data in response to driving said film into said film cartridge by said film drive means in said halfway film rewind mode.

4. A photographic camera as defined in claim 1, wherein said data entry means comprises manually operated entry switches through which numerical data is entered according to a number of operations and a data display device for displaying said numerical data.

5. A photographic camera as defined in claim 1, wherein said mode setting means further comprises means for setting the photographic camera to a data selection mode in which the photographic camera retrieves said cartridge data from said memory, said photographic camera further comprising a data selector for retrieving a data pair of said cartridge data and said data of a number of unexposed film frames on the cartridge, and for displaying said data pair for visual observation when said photographic camera is set to said data selection mode.

6. A photographic camera as defined in claim 5, wherein operation of said data selector sequentially retrieves from said memory and displays the data pairs containing cartridge data together with a number of unexposed film frames.

7. A photographic camera for use with a film cartridge comprising:

data entry means for entering cartridge data relating to the film cadge into the photographic camera;

a memory for storing said cartridge data entered through said data entry means, together with corresponding data representative of the number of unexposed film frames of said film in said film cartridge;

mode setting means for setting said photographic camera to a data selection mode in which the photographic camera retrieves said cartridge data from said memory; and a data selector for retrieving a data pair of said cartridge data and said data of a number of unexposed film frames and displaying said data pair for visual observation when said photographic camera is set to said data selection mode.

8. A photographic camera as defined in claim 7, wherein said data selector further clears said data pair, displayed for visual observation, from said memory.

9. A photographic camera as defined in claim 7, wherein operation of said data selector sequentially retrieves from said memory and displays the data pairs containing cartridge data together with a number of unexposed film frames.

* * * * *